Feb. 1, 1966     A. BOYSEN ETAL     3,232,342
ROOM UNIT FOR VENTILATING AND AIR-CONDITIONING
Filed March 22, 1962     2 Sheets-Sheet 1
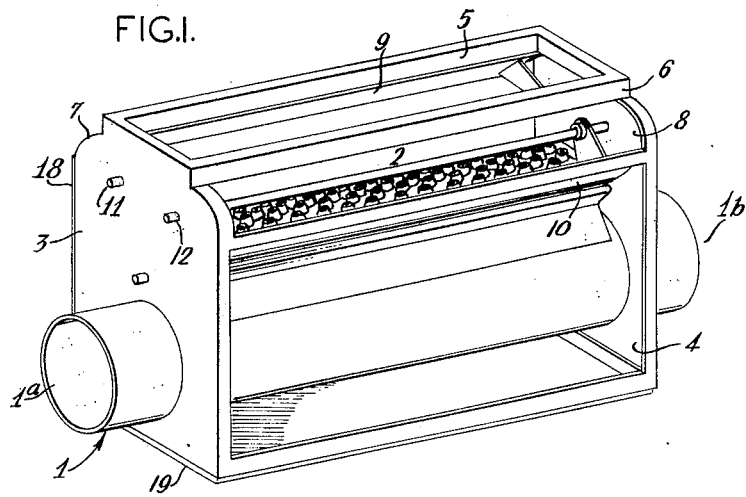
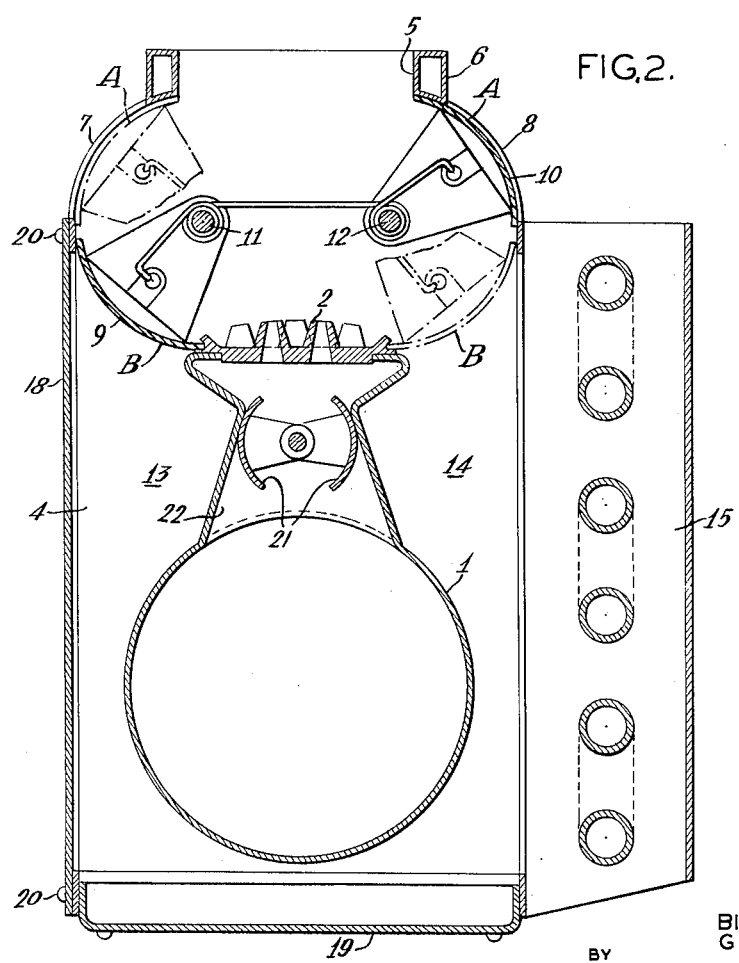
INVENTORS:
ARNE BOYSEN
BIRGER LÄRKFELDT
GÖSTA STEINHOLTZ
BY Howson & Howson
ATTYS.

Feb. 1, 1966     A. BOYSEN ETAL     3,232,342
ROOM UNIT FOR VENTILATING AND AIR-CONDITIONING
Filed March 22, 1962     2 Sheets-Sheet 2
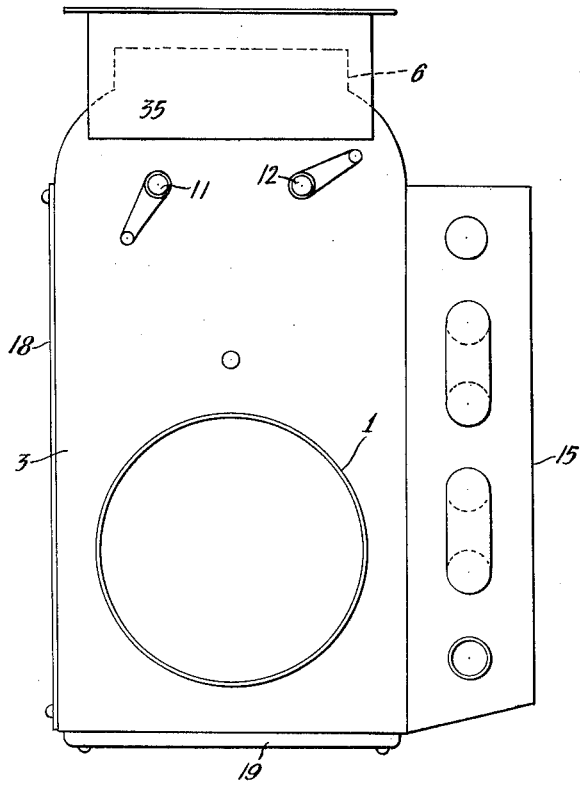
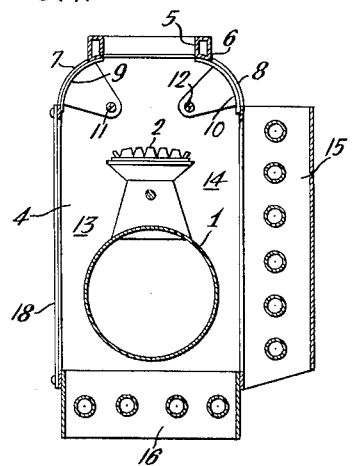
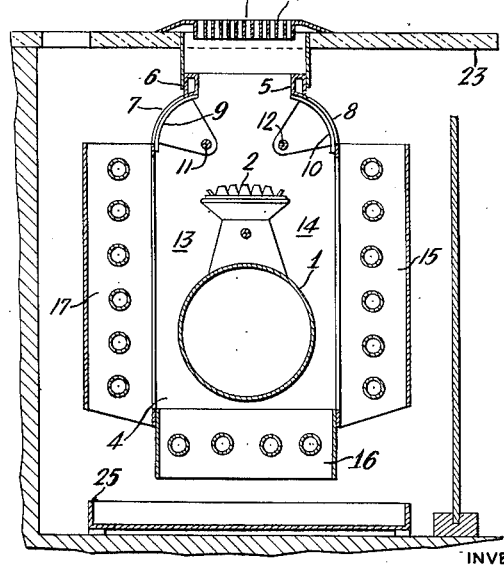
INVENTORS:
ARNE BOYSEN
BIRGER LÄRKFELDT
GÖSTA STEINHOLTZ
BY Howson & Howson
ATTYS.

United States Patent Office 3,232,342
Patented Feb. 1, 1966

3,232,342
ROOM UNIT FOR VENTILATING AND AIR-CONDITIONING
Arne Boysen, Lidingo, and Birger Lärkfeldt and Gösta Steinholtz, Jonkoping, Sweden, assignors to Aktiebolaget Svenska Flaktfabriken, Stockholm, Sweden
Filed Mar. 22, 1962, Ser. No. 181,695
Claims priority, application Sweden, Mar. 23, 1961, 3,086/61
3 Claims. (Cl. 165—123)

The present invention relates to a room unit for ventilating and air-conditioning, which is intended to be placed as an apparatus behind a window panel or other separate enclosure and comprising a duct for the supply of pretreated primary air, induction means connected to said duct for the mixing of room air as secondary air and a heat exchanger for the final treating of the secondary air.

In earlier constructions of apparatus for the above mentioned purpose the size of the heat exchanging element has been fixed or limited within a narrow scope with respect to the means of the apparatus for the air supply. In a building there is a very varying need of heat supply or transport to and from the different rooms respectively depending upon the orientation of the rooms, the installation of heat producing apparatus in the rooms, or the like. To fulfil these varying demands one has therefore previously been forced to vary also the quantity of air blown to the respective rooms. The present invention relates to a room unit so constructed that one end and the same part being used for the air supply can be combined with one or more heat exchanging elements whereby a sufficient capacity for the supply and discharge of heat respectively can be obtained without making it necessary to thereby vary the heat supply. This property is worth while from the reason that each increase of the quantity of supplied air over the quantity necessary for ventilating purpose involves an increase of the costs for the plant as well as of the costs for the conditioning and supply of the air. Of course, there will also be an increase of the costs for the exhaust of this extra quantity of air.

When a plant is constructed for final cooling in the room units there is a need for a considerably larger heat exchanging surface than when the plant is not constructed for final cooling. In earlier constructions one has therefore already by the construction of the plant been forced to bind oneself for one of the above mentioned alternatives. A very considerable advantage of this apparatus is that a plant from the beginning can be dimensioned and constructed without final cooling arrangements. If final cooling at a later occasion should be found desirable for improving the air conditioning of the building this completion can be made without a charge or any exchanges in the air distributing system and without any change of the connection of the room unit to the distributing ducts for the air and the heat exchange medium respectively.

The room unit in accordance with the invention is characterized in that the supply duct and the induction means are arranged in a substantially parallelepipedical enclosure and that the supply duct and the induction means are joined with wall plates constituting the ends of said enclosure and its top side equipped with a discharge opening for mixed primary and secondary air, said plates and ends and top side forming together a unit, i.e. the ground or basic unit of the apparatus, and that the other three sides consist of heat exchanger units in number corresponding to the need for each special case or blind plates replacing said heat exchanger units which are attached to the ground unit by the aid of means arranged on the ground unit and lastly that the two ends of the supply duct project through the ends for making it possible to join the apparatus to the air distributing system of the ventilating and conditioning plant or for coupling in series two adjacent room units. The heat exchanging units according to the invention are suitably so formed that by a change of the number of heat exchanging units this change can be carried out without changing the connection of the apparatus to the duct system of the plant.

A suitable embodiment of the invention is characterized in that the ground unit is equipped with two openings provided with dampers and located at both sides of the discharge opening for a direct supply of non-treated secondary air. The dampers placed at the openings for a direct supply of non-treated secondary air are suitably arranged to be manoeuvred by one and the same manoeuvring means and coupled to this in such a way that by the turning of the manoeuvring means at first only one of the dampers moves while the movement of the other damper is not started until the first mentioned damper has reached its intended end position. A room unit equipped with such dampers may suitably be constructed in such a way that the manoeuvring means of the dampers is arranged to act simultaneously upon a valve for the regulating of the medium to the heat exchanger(s). Such damper and valve control means may be of the type shown in Patent No. 3,018,088, January 23, 1962.

The invention will now be described more in detail with reference to the accompanying drawing showing an exemplifying embodiment of a room unit according to the invention and wherein FIG. 1 shows a perspective view of the ground unit of the apparatus;

FIG. 2 is an enlarged central transverse vertical section taken about the middle of FIG. 1 but with a heat exchange unit added on the front;

FIG. 3 is an end view showing enough of the valve and damper mechanism to indicate its operation;

FIG. 4 is a section like FIG. 2 but on a reduced scale and showing the addition of a bottom heat exchange unit; and FIG. 5 is a section of a complete installation having heat exchange units installed on the front bottom and back.

In the drawings 1 designates a supply duct for primary air and 2 designates induction means connected to the duct. In accordance with the invention the supply duct and the induction means are enclosed in a substantially parallelepipedic enclosure comprising end wall plates 3 and 4, respectively, and its top side 6, the top side being provided with a discharge opening 5 for mixed primary and secondary air. The two ends 1a and 1b, respectively, of the distributing duct 1 project through the enclosure ends 3 and 4, respectively, for providing the connection of the apparatus with the air distributing system of the plant and coupling in series the apparatus with adjacent room unit(s). The ground unit is equipped with two openings 7 and 8, respectively, located on each side of the discharge opening 5 and being intended for a direct supply of non-treated secondary air. 9 and 10, respectively, designate two dampers swingable around their respective shafts 11 and 12. The dampers are arranged to close said supply openings 7 and 8 in one of their end positions A and in their other end position B to uncover entirely said openings and shut off the connection with the side chambers 13 and 14, respectively of the ground unit, said chambers constituting supply channels for secondary air to be treated (i.e. heated and cooled, respectively) by means of heat exchanging elements 15, 16 and 17 attached to the ground unit. These elements may according to the existing need consist of the unit 15 placed on the front side of the ground unit facing the room (as illustrated in FIGS. 2, 3, 4 and 5) or consist of said unit 15 together with a unit 16 mounted below the ground unit (as illustrated in FIGS. 4 and 5) or lastly consist of three units 15, 16, 17 (as illustrated in FIG. 5). The sides of the ground unit which are not utilized for the connection of heat exchangers are shielded by means of covering plates 18 and 19, respectively, which just as the heat exchanging units, are fastened to the ground unit by means, such as screws or bolts 20 arranged on the same. 21 designates a damper for shutting off the primary air and located in a part of the channel 22 by means of which channel the ejecting means 2 is connected to the distributing duct 1.

In FIG. 5 the designation number 23 is a cover and 24 designates a grill arranged above the discharge opening of the apparatus. 25 designates a pan for the collection of condensated moisture, if any. The room unit is in known manner provided with a valve (not shown in the drawing) for the regulating of the medium supply to the heat exchanger(s). As stated above, the manoeuvring means of the dampers 9 and 10, respectively, is suitably arranged to act simultaneously upon this valve.

What we claim is:

1. A ventilating and air conditioning unit adapted to be placed at a window or other separate closure for a room opening for supplying pre-treated primary air from a duct and secondary air from the room, comprising a basic enclosure including end walls and a top wall having an aperture for the discharge of conditioned air into the room, said basic enclosure having openings on the bottom, front and rear sides with anchorages adapted for the selective securement over said openings of a closure plate or heat exchange means for treating secondary air from the room, primary air duct means extending through said end walls and having a primary air outlet within said basic enclosure located at a distance below said top wall aperture, leaving space on the sides thereof above said side openings for secondary air from the room, a heat exchange unit in each of a certain of said openings, and a closure plate covering each of the remainder of said openings, said units and cover plates being secured to their respective anchorages.

2. Apparatus as set forth in claim 1, further characterized by the fact that said basic enclosure is provided with supplemental secondary air openings located above said side openings and damper means controlling said supplemental openings.

3. Apparatus as set forth in claim 2, further characterized by the fact that said basic enclosure includes a lower portion in which said side apertures and said primary air duct means are located and an upper portion in which said supplemental air openings and valves are located, the spaces on the sides of said primary air duct means opening into said upper portion, and each of said damper means being arranged to cover selectively a supplemental air opening or one of said side spaces through which air is supplied from a side opening.

References Cited by the Examiner

UNITED STATES PATENTS 2,345,537   3/1944   Keep _____ 165—123
3,018,088   1/1962   Allander et al. _____ 165—123

FOREIGN PATENTS 379,430   9/1932   Great Britain.

ROBERT A. O'LEARY, *Primary Examiner.*

CHARLES SUKALO, *Examiner.*